United States Patent

Cormode et al.

(10) Patent No.: US 9,116,958 B2
(45) Date of Patent: Aug. 25, 2015

(54) METHODS AND APPARATUS TO SAMPLE DATA CONNECTIONS

(71) Applicant: AT&T Intellectual Property I, L.P., Atlanta, GA (US)

(72) Inventors: Graham Cormode, Morristown, NJ (US); Edith Cohen, Palo Alto, CA (US); Nicholas Geoffrey Duffield, Summit, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 216 days.

(21) Appl. No.: 13/708,756

(22) Filed: Dec. 7, 2012

(65) Prior Publication Data

US 2014/0164392 A1 Jun. 12, 2014

(51) Int. Cl.
*G06F 17/30* (2006.01)

(52) U.S. Cl.
CPC ...... *G06F 17/3048* (2013.01); *G06F 17/30377* (2013.01)

(58) Field of Classification Search
CPC .................................................. G06F 17/3048
USPC ......................................................... 707/690
See application file for complete search history.

(56) References Cited

U.S. PATENT DOCUMENTS

| 5,881,051 A * | 3/1999 | Arrowood et al. | 370/248 |
| 7,013,252 B1 * | 3/2006 | Shih et al. | 703/14 |
| 7,409,576 B2 * | 8/2008 | Pomaranski et al. | 714/3 |
| 8,295,178 B2 * | 10/2012 | Daily | 370/235 |
| 2003/0225549 A1 * | 12/2003 | Shay et al. | 702/182 |
| 2012/0110331 A1 * | 5/2012 | Falk et al. | 713/168 |

OTHER PUBLICATIONS

Andoni et al., "Streaming Algorithms via Precision Sampling", Apr. 26, 2011, pp. 1-26.
Babcock et al., "Sampling From a Moving Window Over Streaming Data", 2002, pp. 1-2.
Braverman et al., "Optimal Sampling from Sliding Windows", 2009, pp. 1-13, USA.
Cohen et al., "Algorithms and Estimators for Accurate Summarization of Internet Traffic", Oct. 24-26, 2007, pp. 1-14, USA.
Cohen et al., "Sketching Unaggregated Data Streams for Subpopulation-Size Queries", Jun. 11-14, 2007, pp. 1-10, China.
Cohen et al., "Summarizing Data using Bottom-k Sketches", Aug. 12-15, 2007, pp. 225-234, USA.
Cohen et al., "Tighter Estimation using Bottom-k Sketches", Aug. 24-30, 2008, pp. 1-17, New Zealand.

(Continued)

*Primary Examiner* — Baoquoc N To
(74) *Attorney, Agent, or Firm* — Hanley, Flight & Zimmerman, LLC (57) ABSTRACT

Methods, apparatus, and articles of manufacture are disclosed to sample signed weighted updates. Example methods disclosed herein include identifying a first key associated with a data update obtained by sampling a stream of data received from a plurality of nodes in a network, the first key being representative of a first node in the plurality of nodes, adjusting a first value associated with the first key based on a weight associated with the data update, the weight being positive when the data update corresponds to opening of a new data connection with the first node, the weight being negative when the data update corresponds to closing of an existing data connection with the first node, and estimating a status of the first node based on the first value.

20 Claims, 6 Drawing Sheets

(56) References Cited

OTHER PUBLICATIONS

Cormode et al., "Summarizing and Mining Inverse Distributions on Data Streams via Dynamic Inverse Sampling", Jul. 2005, pp. 1-28, DIMACS Technical Report Nov. 2005.

Estan et al., "New Directions in Traffic Measurement and Accounting: Focusing on the Elephants, Ignoring the Mice", 2002, pp. 1-42, USA.

Frahling et al., "Sampling in Dynamic Data Streams and Applications", Jun. 6-8, 2005, pp. 1-8, Italy.

Gemulla et al., "A Dip in the Reservoir: Maintaining Sample Synopses of Evolving Datasets", Sep. 12-15, 2006, pp. 1-12, Korea.

Gemulla et al., "Maintaining Bernoulli Samples over Evolving Multisets", Jun. 11-14, 2007, pp. 1-10, China.

Gibbons et al., "New Sampling-Based Summary Statistics for Improving Approximate Query Answers", 1998, pp. 1-12.

Gibbons et al., "Estimating Simple Functions on the Union of Data Streams", 2001, pp. 281-290, Greece.

Hoffman et al., "Streaming Algorithms for Data in Motion", 2007, pp. 1-11.

Jowhari et al., "Tight Bounds for Lp Samplers, Finding Duplicates in Streams, and Related Problems", Jun. 13-15, 2011, pp. 49-58, Greece.

Manku et al., "Approximate Frequency Counts over Data Streams", 2002, pp. 1-12, China.

Bengt Rosen, "Asymptotic Theory for Successive Sampling with Varying Probabilities without Replacement, I", The Annals of Mathematical Statistics, 1972, vol. 43, No. 2, pp. 373-397.

Jeffrey Scott Vitter, "Random Sampling with a Reservoir", Mar. 1985, ACM Transactions on Mathematical Software, vol. 11, No. 1, pp. 37-57.

* cited by examiner

METHODS AND APPARATUS TO SAMPLE DATA CONNECTIONS

FIELD OF THE DISCLOSURE

This disclosure relates generally to sampling, and, more particularly, to methods, apparatus, and articles of manufacture to sample data connections.

BACKGROUND

Random sampling is a tool that can be used to facilitate working with large datasets. For example, through random sampling, querying of a full dataset can be replaced by querying of a smaller (and hence easier to store and manipulate) sample of the full dataset. A random sample constitutes a summary obtained by randomly sampling the data in the full data set such that the summary can be used to represent the full dataset.

DETAILED DESCRIPTION

Example methods, apparatus, and articles of manufacture disclosed herein present a stream sampling method that can handle signed weighted updates. Previous techniques of stream sampling are limited in that they consider unweighted samples or weighted samples having only positive weight. In the illustrated examples presented herein, signed weighted updates of a sample, whether positive or negative, are analyzed and appropriate sampling thresholds for bounding the number of samples stored in a cache are established to generate an estimate for a characteristic of a full dataset.

Prior sampling techniques of large datasets focused on a random access model where the data is static and disk resident. However, in modern applications received data is generally not static, but rather is constantly changing. Thus, the data in such applications can be defined as a stream of transactions, where each transaction modifies the current state of the data.

For example, such a data stream can correspond to a sequence of financial transactions, each of which updates an account balance. In such examples, it may be desirable to be able to maintain a sample over current balances, which describes the overall state of the system, and to use the sample to provide a snapshot of the system against which to quickly test for anomalies without having to traverse the entire account database.

As another example, such a data stream can correspond to records that are inserted in and/or deleted from tables of a database. An example database management system may keep statistics on each attribute within a table, to determine what indices to keep, and how to optimize query processing. Currently, deployed systems track only simple aggregates online (e.g. number of records in a table), and more complex statistics involve a complete scan of the database, which may be unsuitable for (near) real-time systems.

As yet another example, such a data stream can represent network activities at a number of nodes of the network. For example, such network activities could include setting up and/or tearing down data connections, from which an identification can be made of whether the data connections are active or have been terminated. In some examples, other characteristics of the data connections can be additionally or alternatively tracked. Such example characteristics may include, but are not limited to, the number of file transfer protocol (FTP) connections currently in a network, the number of connections to a particular region, the number of connections lasting longer than a particular time (e.g., an hour), etc. It may not be practical for a service provider of a network or data system to centrally keep a complete list of all current open and active connections and/or other network characteristics. Instead, example methods, apparatus, and articles of manufacture (e.g., storage media) for random sampling as disclosed herein can draw a random sample of the connections from which the service provider can determine statistics, for example, on quality of service, round-trip delay, nature of traffic in the network, etc. Such example statistics may be used, for example, to show that agreements between the service provider and its customers are being met, and/or may be used for traffic shaping and planning purposes, etc.

Example methods, apparatus, and articles of manufacture disclosed herein perform random sampling of a data stream in which each data entry of the stream includes a positive or negative update weight $\Delta$ associated with one or more keys, i. The keys, i, of the data stream represent respective information elements for which one or more characteristics can be estimated from information provided via the data stream. For example, the keys, i, of the data stream can represent respective different network nodes of a network, different customers whose transactions are stored in a database, different tables or addresses of a database, etc. As such, the keys i represent elements (such as network nodes, etc.) whose characteristic(s) can be monitored using information obtained via the sampled data stream.

In the illustrated examples, samples (e.g., messages) are taken from the data stream that include (or can be mapped to) a key identifier i and corresponding update value $\Delta$. The example key identifier i of the sample is used to determine that the sample is associated with a key i, stored in the cache. The update value $\Delta$ represents a change to a data characteristic of the key i (e.g., a data connection at a corresponding node opened).

In the illustrated examples provided herein, the data to be sampled is a stream of updates of the form $(i, \Delta)$, where i identifies a particular key to be sampled and $\Delta \in R$, where R is the set of real numbers. In the illustrated examples, a value $v_i$ of key is initially 0 and is modified by subsequent updates, but aggregate values of the keys do not become negative. Formally, the value of key i is initially $v_{i=0}$ and after update $(i, \Delta)$, becomes:

$$v_i \leftarrow \max\{0, v_i + \Delta\}.$$

Some example methods, apparatus, and articles of manufacture disclosed herein maintain an example cache S of keys being monitored and an example count $c_i$ for each cached key $i \in S$. In some examples, a sampling threshold $\tau$, corresponding to the inverse of a sampling rate q (i.e., $\tau=1/q$), is used to determine the number of keys to be kept in the cache S. When an instance of a key i is sampled, if $i \in S$ (i.e., the sampled instance is associated with a key i that is in the cache S), the example counter is adjusted based on the update weight $\Delta$ of the key i. If the key i is not in the cache S, then the key i may be added to the cache S based on the update weight $\Delta$ and the sampling threshold $\tau$.

In some examples, a bounded sized cache is implemented by cache S that is to store counts $c_i$ for at most k keys. Such example methods, apparatus, and articles of manufacture disclosed herein strive to keep the cache S at full capacity of k keys. In some such examples, an effective sampling threshold for entering the key i into the cache S varies. For example, the sampling threshold may increase after processing a sample associated with a key having a positive update but decrease after processing a sample having a negative update. In some such examples, when one or more negative update(s) cause removal of a key from the cache S so there are fewer than k cached keys, the effective sampling threshold becomes zero. In some examples, the count $c_i$ of each corresponding cached key i is adjusted based on an adjustment (e.g., an increase) to the sampling threshold $\tau$ (e.g., $\tau+c_i$). Such example methods, apparatus, and articles of manufacture described herein provide unbiased estimates with bounded variance as a function of the effective sampling rate.

Figure 1:
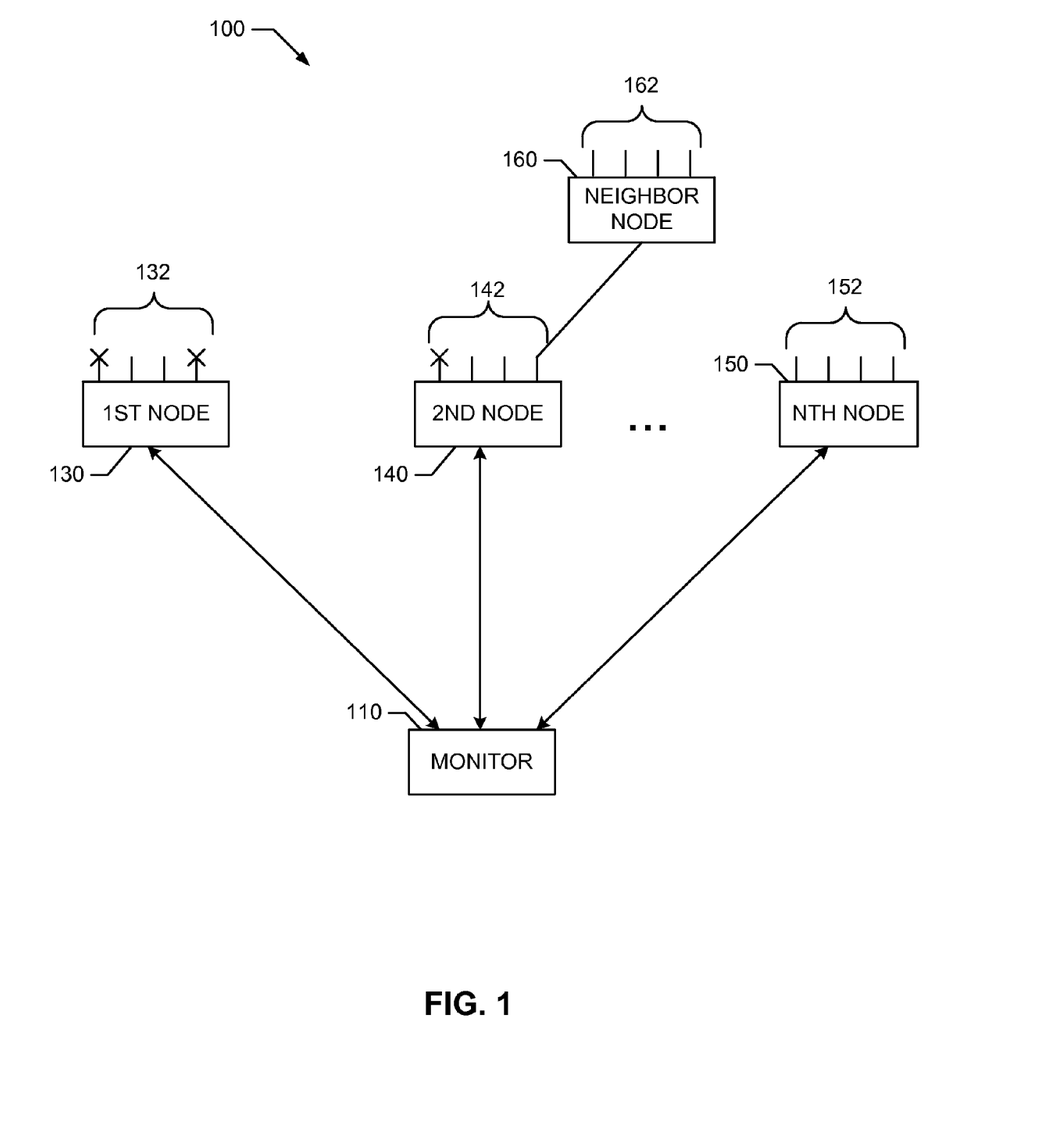
FIG. 1 is a block diagram of an example data system including an example monitor constructed in accordance with the teachings of this disclosure.

FIG. 1 is a block diagram of an example data communication system 100 including an example monitor 110 constructed in accordance with the teachings of this disclosure. The example data communication system 100 may be a network (e.g., a wide area network (WAN), a local area network (LAN), a cellular network, the Internet, a service provider network, etc.), a database, etc. The example data communication system 100 includes the example monitor 110, an example first node 130, an example second node 140, an example Nth node 150, and an example neighbor node 160. The example Nth node 150 represents a total number of nodes N monitored by the example monitor 110. In the illustrated example of FIG. 1, the neighbor node 160 is a neighbor node to the second node 140, such that the monitor 110 can only monitor the neighbor node 160 via the second node 140.

In the illustrated example of FIG. 1, each of the nodes 130, 140, 150, and 160 include data connection ports 132, 142, 152, and 162, respectively. In the illustrated example of FIG. 1, the example nodes 130, 140, 150, and 160 may be one or more of a router, gateway, user endpoint, and/or any other type of communication device. In some examples, the example nodes 130, 140, 150, and 160 are databases, database locations, and/or database addresses. In some examples, the example nodes 130, 140, 150, and 160 may be members of a monitored group having a number of characteristics (e.g., network connection statistics, financial statistics, etc.) that are being tracked.

In the illustrated example of FIG. 1, the example monitor 110 seeks to estimate the number of open data connection ports and/or active data connections of the communication system 100. In some examples, the example monitor 110 additionally or alternatively tracks other characteristics of data connections (e.g., connection type, source or destination locations, length of time, etc.). In the illustrated example of FIG. 1, the example data connections 132, 142, 152, and 162 are designated as active/open when marked with an 'X' and inactive/available when not marked with an 'X'. For example, the first node 130 has two available connections, the second node 140 has two available connections (one active marked by an 'X' and one connected to the neighbor node 160), the Nth node 150 has four available connections, and the neighbor node 160 has four available connections. In some examples, the neighbor node 160 may be combined with the second node 140 yielding a combination of six available connections.

The example monitor 110 of FIG. 1 receives a stream of updates from the first node 130, the second node 140, and the Nth node 150 and samples the updates at a sampling rate q (e.g., one out of every ten received updates are sampled). In the illustrated example, the example updates are received from the nodes 130, 140, 150 corresponding to data representative of the data connections 132, 142, 152, respectively. The updates include update information (i, $\Delta$) where i identifies a corresponding node associated with the sampled update and $\Delta$ represents the update weight. In some examples, the updates include update information for any set of the data connections 132, 142, 152, 162. For example, the update weight $\Delta$ can represent a change in the status of the example data connections 132, 142, 152. For example, if one of the data connections 132 is opened, then the update weight is a positive one ($\Delta=+1$). In another example, if the two active data connections of the data connections 132 close, the update weight is a negative two ($\Delta=-2$).

In some examples, the update information (i, $\Delta$) includes or is accompanied by data connection characteristics (e.g., the type of data connection that was established or that was ended, the start and/or end time of a data connection, location information of the source and/or destination of the data connection, etc.).

The example monitor 110 of FIG. 1 caches values representative of a number of activities and/or characteristics of interest, hereinafter referred to as keys, from the nodes 130, 140, 150. In the illustrated example, a key may be cached based on (1) whether updates corresponding to previously sampled data from the nodes 130, 140, 150 have caused the key to already be stored in the cache S and/or (2) an evaluation of the update weight $\Delta$ of a sample corresponding to the key. In the illustrated example of FIG. 1, the monitor 110 estimates the number of open and/or active data connections of the nodes 130, 140, 150 and/or any other nodes of the data communication system 100 based on the keys stored in the cache S and the corresponding cumulative weights of the cached keys. In some examples, the monitor 110 additionally or alternatively estimates other characteristics (e.g., number of a particular type of data connection currently open, number of data connections that have been opened for a particular length of time, etc.) of the communication system 100 based on the keys stored in the cache S. In some such examples, the characteristics of the key are also stored in the cache S. The cumulative weights of the keys are kept by a counter of the monitor 110, as described below.

For example, in FIG. 1, the monitor 110 samples (e.g., randomly) a data stream including data from the nodes 130, 140, 150 to obtain a first update from the first node 130 with an update weight indicating that one of the data connections 132 was opened. In this example, a key i is stored in the cache S for the first node 130 and has an update weight $\Delta=+1$. In this example, the monitor 110 continues to sample the data stream to obtain a subsequent update from the first node 130 with an update weight indicating that another of the data connections 132 has become active. In this example, the subsequent update weight $\Delta=+1$, indicating that another connection has opened at the first node 130, causes the monitor 110 to update, for example, a data connection characteristic of the key i stored in the cache S for the first node 130 to have a value of +2, indicating that two connections were opened for the network node represented by the key i.

Figure 2:
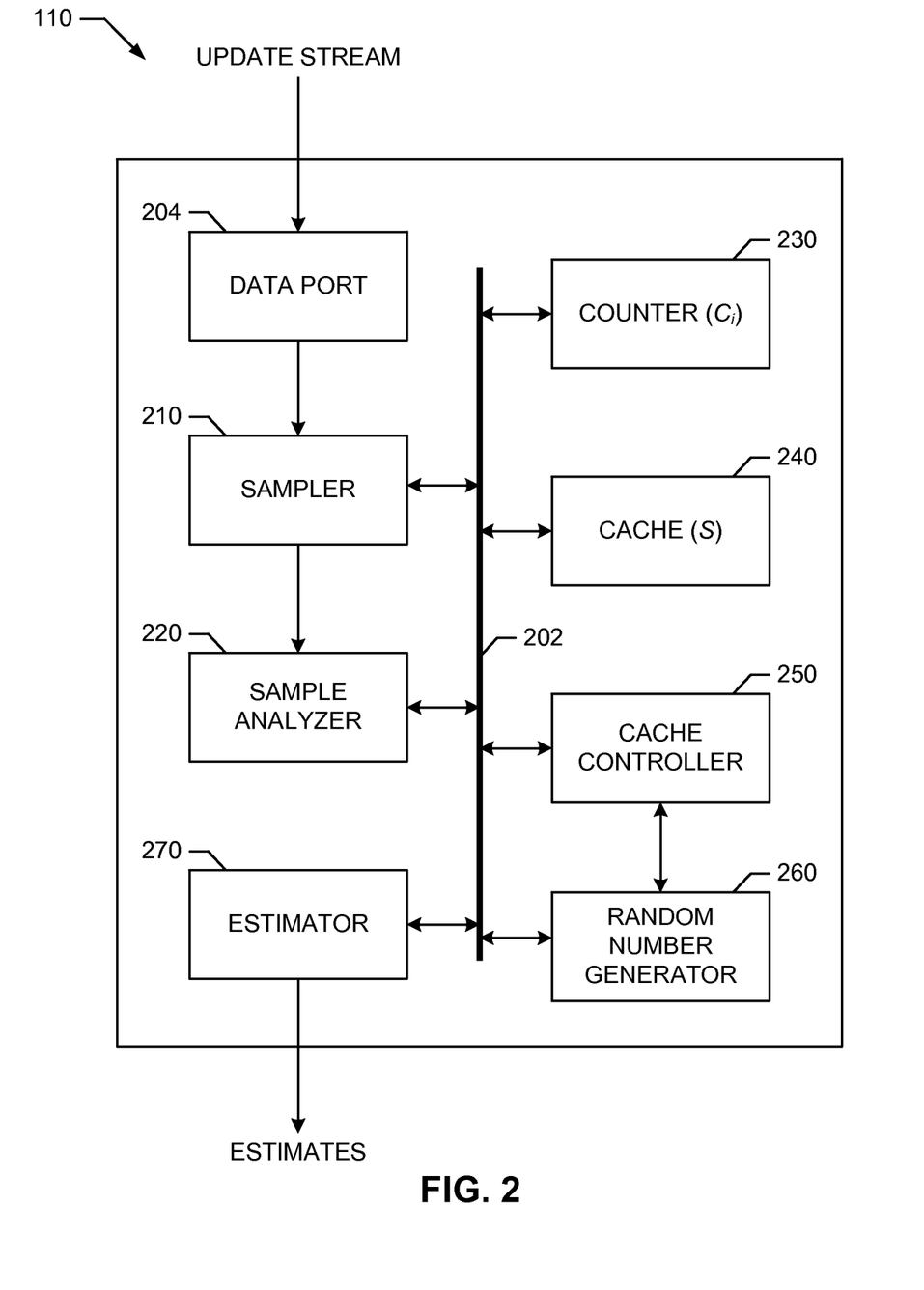
FIG. 2 is a block diagram of an example implementation of the monitor of FIG. 1.

FIG. 2 illustrates an example implementation of the example monitor 110 of FIG. 1. In the illustrated example of FIG. 2, the example monitor 110 includes an example sampler 210, an example sample analyzer 220, an example counter 230, an example cache 240, an example cache controller 250, an example random number generator 260, and an example estimator 270. An example communication bus 202 facilitates communication between the sampler 210, the sample analyzer 220, the counter 230, the cache 240, the cache controller 250, the random number generator 260, and the estimator 270.

In the illustrated example of FIG. 2, an example data port 204 receives a stream of updates from the nodes 130, 140, 150 and/or any other nodes monitored by the monitor 110 of FIG. 1. The example data port 204 receives the updates via a wireless and/or wired connection. The example sampler 210 of FIG. 2 samples (e.g., randomly) updates from the stream of updates. In the illustrated example, the sampler 210 forwards a sample to the sample analyzer 220.

The example sample analyzer 220 of FIG. 2 determines whether a sample is an update to key i based on identification information included in the sampled update (i, $\Delta$). For example, the identification information may be a source or destination address of a network packet that indicates that the monitor 110 received the sampled update from one (or a combination) of the nodes 130, 140, 150, 160 of FIG. 1.

In the illustrated example of FIG. 2, the sample analyzer 220 determines whether a key i corresponding to the sampled update is stored in the cache 240. If the key i is stored in the cache 240, then the sample analyzer 220 instructs the counter 230 to update a count $c_i$ associated with the key i. As such, the example counter 230 of FIG. 2 maintains counts ($c_i$) that track the updates ($\Delta$) made to the keys (i) stored in the cache 240. For example, the key i uses a corresponding count $c_i$. In the illustrated example, if the key i is stored in the cache 240, the counter 230 adjusts the count $c_i$ based on the weight $\Delta$ ($c_i \leftarrow c_i + \Delta$) included in the sampled update.

Furthermore, assume that the sampled update is associated with the first node 130 and, thus, the key being analyzed is the key i representing the first node 130. In the illustrated example, the count $c_i$ may not be equal to a true data connection value $v_i$ of the first node 130, which is two in the illustrated example of FIG. 1 ($v_{i=2}$ because two of the data connections 132 are open). For example, the count $c_i$ may have a value of "1", while the true value $v_i$ has a value of "2" corresponding to the two open data connections 132. The count $c_i$ may not equal the true value $v_i$ because not every sample update may be reflected in the keys stored in the cache S because the sample updates are sampled based on a sampling rate $q=1/\tau$, where $\tau$ is a sampling threshold of the monitor. In the illustrated example, only updates that are sampled for storage in the cache S affect the count $c_i$, while every update to the node affects the true value $v_i$.

In the illustrated example of FIG. 2, the counter 230 stops maintaining the count $c_i$ for a key i when a negative weight $\Delta$ from a sampled update causes its value to be equal to or less than zero (i.e., $c_{i\leq 0}$) or when the counter 230 determines that a negative weight $\Delta$ from a sampled update would cause the count $c_i$ to drop to zero or less than zero (i.e., $c_i + \Delta \leq 0$). Once the counter 230 determines that the count $c_i$ is less than or equal to (or, equivalently, no greater than) zero or would become less than or equal to zero, the counter 230 instructs the cache controller 250 to remove the key i from the cache 230. This allows the example monitor 110 to efficiently handle signed updates, whether negative or positive, and manage the number of samples stored in cache 240.

In the illustrated example of FIG. 2, if the key i is not stored in the cache 240, then the sample analyzer 220 instructs the cache controller 250 to determine whether the key i (including associated characteristics) should be stored in the cache 250.

To perform such a determination, in some examples, the cache controller 250 requests a random number from the random number generator 260. The random number generator 260 generates a random number r based on the sampling threshold $\tau$. For example, the random number generator 260 may use the sampling threshold $\tau$ as the mean of a probability distribution used to generate the random numbers provided to the cache controller 250. The random number generator 260 provides the cache controller 250 with the random number r.

The example cache controller 250 of FIG. 2 receives the random number r and compares it to the update weight $\Delta$ of the key i. If the random number r is less than the update weight $\Delta$, then the key i is added to the cache 240 and the count $c_i$ of the key i is set to $\Delta - r$ by the counter 230. In the illustrated example, subtracting the random variable r from the update weight $\Delta$ accounts for any updates from the first node 130 that were not sampled.

In some examples, if the cache controller 250 determines that the key i is to be added to the cache 240, the cache controller 250 removes an existing key stored in the cache 240 to make room for the new key i. In some such examples, the cache controller 250 maintains a sampling threshold $\tau_i$ for the keys stored in the cache 240. In the illustrated example, the cache controller 250 adjusts the sampling thresholds for the keys in the cache 240 using random numbers from the random number generator 260 when it determines that a new key is to be added. The example cache controller 250 then removes the corresponding key with the lowest adjusted sampling threshold $\tau$, as described below.

The example estimator 270 of FIG. 2 generates an estimate of the status of the data system 100 based on the keys stored in the cache 240 and their corresponding counts stored in the counter 230. In the illustrated example, the estimator 270 generates an estimate of the status of the data communication system 100 (e.g., the number(s) and/or type(s) of open data connections, the length(s) of time one or more connections have been opened, etc.). In generating the estimate, the example estimator 270 identifies the status of the keys i stored in the cache 240 based on their associated counts $c_i$. For example, the estimator 270 may extrapolate the counts $c_i$ to determine an estimate of the number of open data connections for the data communication system 100.

In some examples, the estimator 270 makes an estimate of a characteristic of the data communication system 100 (e.g., the current number of data connections using FTP, the number of data connections opened for at least an hour, the number of data connections currently opened to Europe, etc.). In some such examples the characteristic to be estimated is requested by an example user. In generating an estimate, the example estimator 270 identifies the keys stored in the cache 240 that have the requested characteristic.

The estimator 270 of the illustrated example, calculates a sum s representative of a characteristic based on the keys i in the cache 240 that meet the corresponding characteristic using the sampling threshold $\tau$ and the corresponding counts $c_i$, such that $s \leftarrow s + \tau + c_i$ (where s is reset to 0 before calculating a new estimate corresponding to the requested characteristic). The sum s is calculated from a sum of all keys in the cache 240 corresponding to the requested status (e.g., the number of open data connections) and/or requested characteristic (e.g., an estimate of the number of open data connections that have been opened for a particular length of time) of the data system 100. In the illustrated example, the estimator 270 of FIG. 2 outputs the estimates s to a processor platform for further processing and/or to the example user.

While an example manner of implementing the monitor 110 of FIG. 1 has been illustrated in FIG. 2, one or more of the elements, processes and/or devices illustrated in FIG. 2 may be combined, divided, re-arranged, omitted, eliminated and/or implemented in any other way. Further, the example data port 204, the example sampler 210, the example sample analyzer 220, the example counter 230, the example cache 240, the example cache controller 250, the example random number generator 260, the example estimator 270 and/or, more generally, the example monitor 110 of FIGS. 1 and/or 2 may be implemented by hardware, software, firmware and/or any combination of hardware, software, and/or firmware. Thus, for example, any of the example data port 204, the example sampler 210, the example sample analyzer 220, the example counter 230, the example cache 240, the example cache controller 250, the example random number generator 260, the example estimator 270 and/or, more generally, the example monitor 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example, the example data port 204, the example sampler 210, the example sample analyzer 220, the example counter 230, the example cache 240, the example cache controller 250, the example random number generator 260, the example estimator 270 are hereby expressly defined to include a tangible computer readable storage medium such as a memory, DVD, CD, Blu-ray, etc. storing the software and/or firmware. Further still, the example monitor 110 of FIGS. 1 and/or 2 may include one or more elements, processes and/or devices in addition to, or instead of, those illustrated in FIGS. 1 and/or 2, and/or may include more than one of any or all of the illustrated elements, processes and devices.

Figure 3:
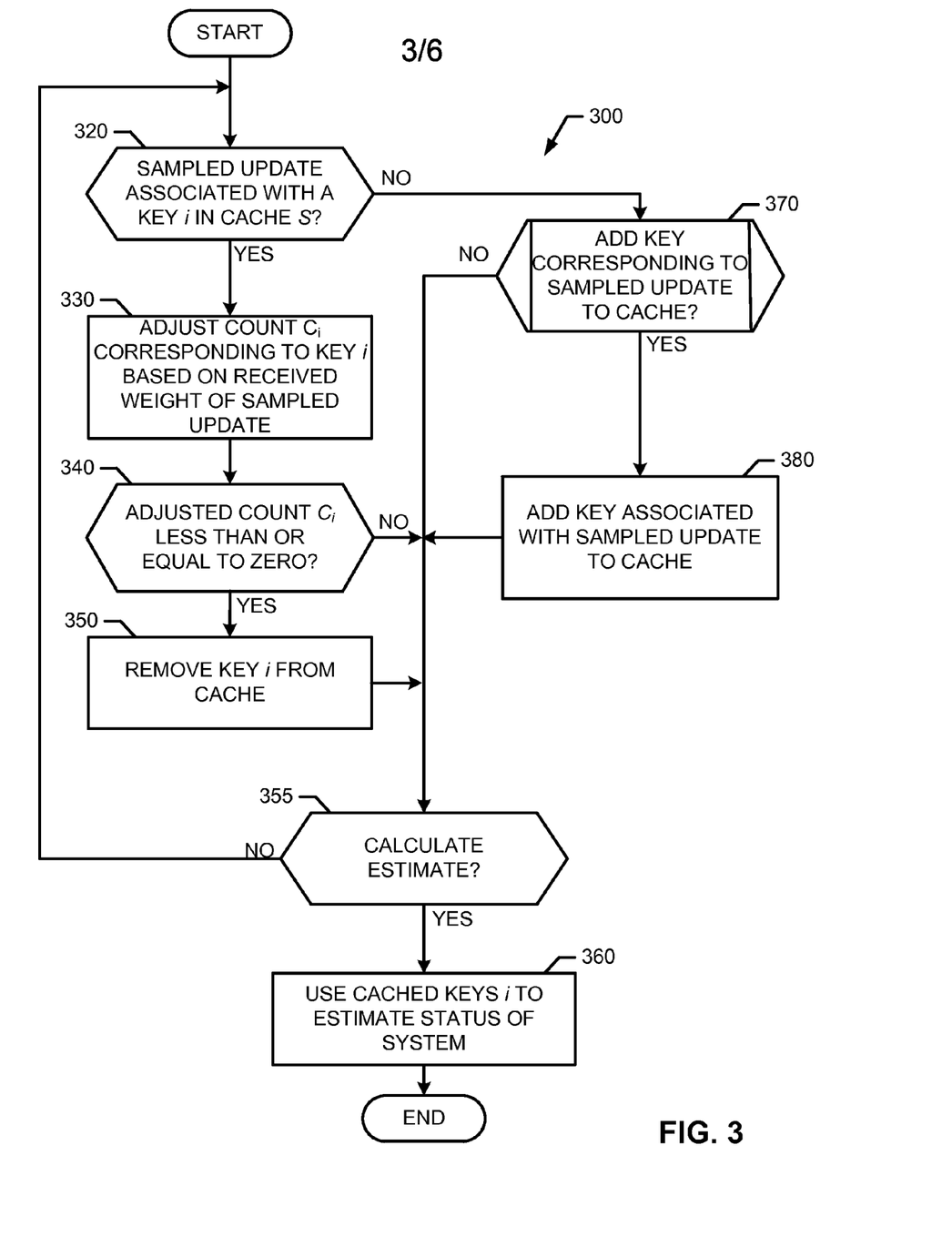
FIG. 3 is a flow chart representative of example machine readable instructions that may be executed to implement the example monitor of FIGS. 1 and/or 2.
Figure 4:
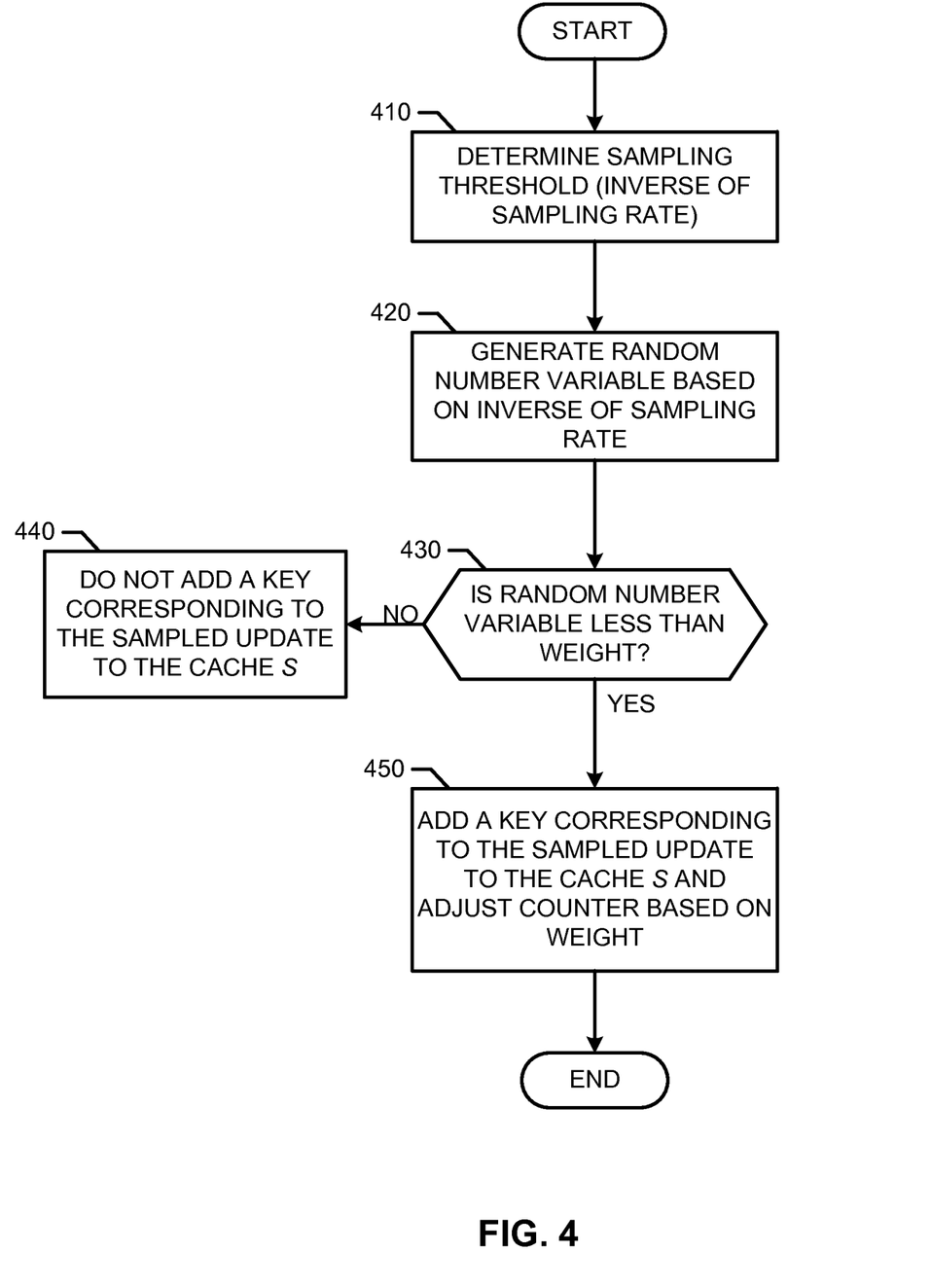
FIG. 4 is a flow chart representative of a first example of machine readable instructions that may be used to implement a portion of the example machine readable instructions of FIG. 3 that may be executed to implement the monitor of FIG. 2.

Flowcharts representative of example machine readable instructions for implementing the monitor 110 of FIGS. 1 and/or 2, and, in particular, the example data port 204, the example sampler 210, the example sample analyzer 220, the example counter 230, the example cache 240, the example cache controller 250, the example random number generator, and the example estimator 270, are shown in FIGS. 3, 4, and/or 5. In these examples, the machine readable instructions comprise a program for execution by a processor, such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3, 4, and/or 5, many other methods of implementing the example monitor 110 may alternatively be used. For example, the order of execution of the blocks may be changed, and/or some of the blocks described may be changed, eliminated, or combined.

As mentioned above, the example processes of FIGS. 3, 4, and/or 5 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage medium in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk and to exclude propagating signals. Additionally or alternatively, the example processes of FIGS. 3, 4, and/or 5 may be implemented using coded instructions (e.g., computer readable instructions) stored on a non-transitory computer readable medium, such as a hard disk drive, a flash memory, a read-only memory, a compact disk, a digital versatile disk, a cache, a random-access memory and/or any other storage medium in which information is stored for any duration (e.g., for extended time periods, permanently, brief instances, for temporarily buffering, and/or for caching of the information). As used herein, the term non-transitory computer readable storage disk or storage device is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Example machine readable instructions 300 that may be executed to implement the monitor 110 of FIGS. 1 and/or 2 are represented by the flow chart shown in FIG. 3. In the illustrated example of FIG. 3, at block 320 of FIG. 3, the example sample analyzer 220 determines whether a sampled update is associated with a key i stored in the cache 240. In the illustrated example, the monitor 110 maintains the cache 240 of keys and associated counts c, using counter 230. The example monitor 110 uses a sampling rate $q=1/\tau$ to determine a number of keys in the cache 240 and/or when to add or remove a new key to the cache 240. In the illustrated example, if the sample analyzer 220 determines that the sampled update is associated with a key i stored in the cache 240, then control moves to block 330. In the illustrated example, the sample analyzer 220 determines whether the sampled update is associated with a key i in the cache 240 by identifying a key identifier (e.g., such as an address of a network node, an identifier of a customer (e.g., a name, a social security number, etc.), etc.) in the sampled update. The example sample analyzer 220 then cross-checks the cache 240 for one or more stored key(s) associated with the sampled update.

At block 330, the sample analyzer 220 instructs the counter 230 to adjust the count $c_i$ associated with the corresponding key i based on the update weight $\Delta$ of the update sample. For example, the update weight $\Delta$ can correspond to a +1 if the sampled update corresponds to a sampled message indicating that a connection has been opened at the first node 130 of FIG. 1, or can correspond to a −1 if the sampled update corresponds to a sampled message indicating that an existing connection has been closed at the first node 130. Accordingly, the counter 230 adds the update weight $\Delta$ to the count $c_i$ ($c_i \leftarrow c_i + \Delta$). In the illustrated example, if the adjusted count $c_i$ is less than or equal to zero, at block 350, the counter 230 instructs the cache controller 250 to remove the key i from the cache 240. In such examples, the key i is removed to allow room in the cache 240 for other keys. After blocks 340 and/or 350, control moves to block 355 of FIG. 3.

In the illustrated example, if the adjusted count $c_i$ is greater than zero, at block 340, the counter 230 maintains the corresponding adjusted counts $c_i$ for use by the estimator 270 (at block 360 described below) in generating an estimate of the status and/or characteristic of the data communication system 100.

Figure 5:
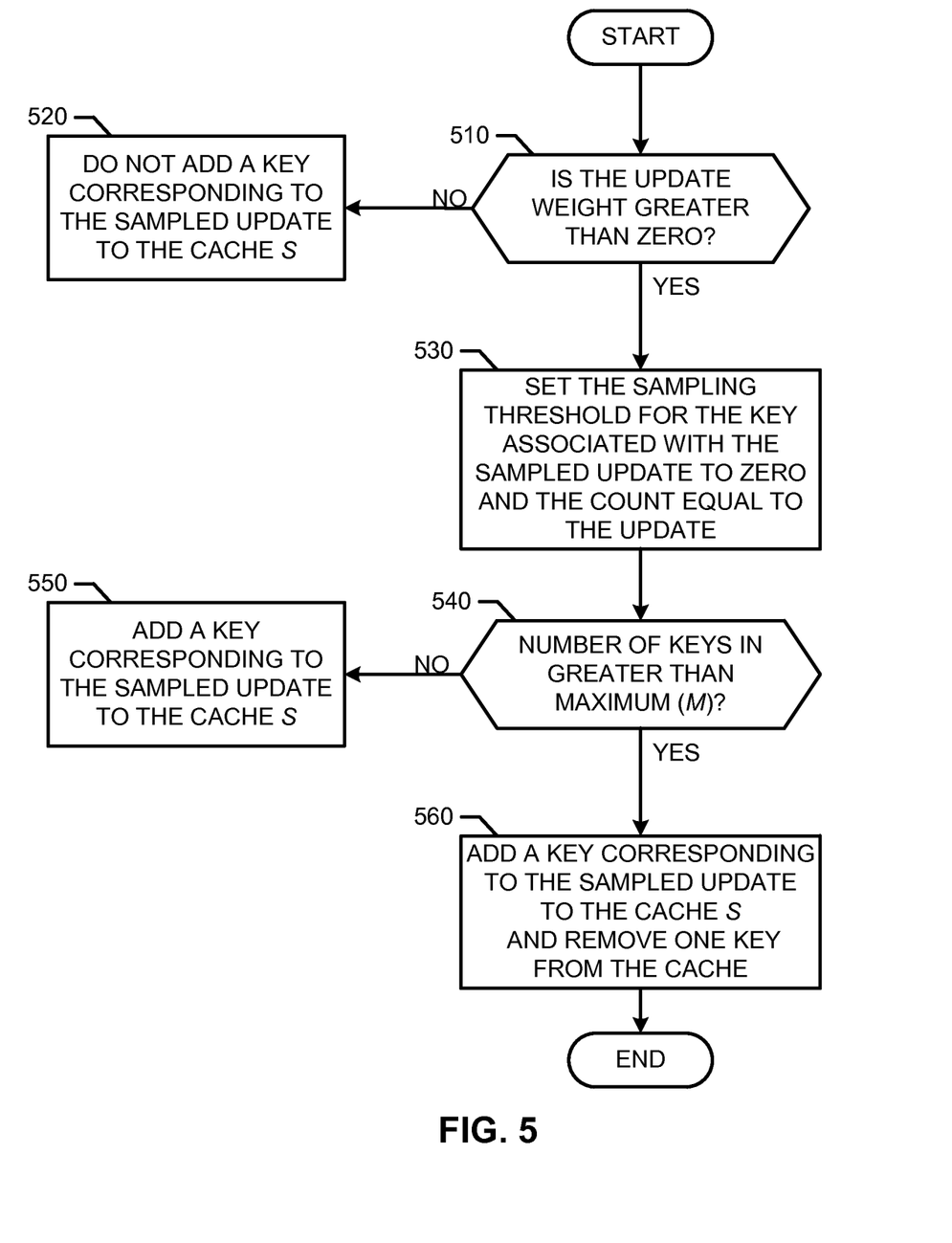
FIG. 5 is a flow chart representative of a second example of machine readable instructions that may be used to implement a portion of the example machine readable instructions of FIG. 3 that may be executed to implement the monitor of FIG. 2.

Returning to block 320 of FIG. 3, if the sampled update is not associated with a key stored in the cache 240, then the sample analyzer 220 instructs the cache controller 250 to determine whether sampled update is to cause a key associated with the sample to be added to the cache 240 and control moves to block 370. At block 370, as further described herein with respect to FIGS. 4 and/or 5, the cache controller 250 determines whether to add a key corresponding to the sampled update to the cache 240. If the cache controller 250 determines that the key is to be added to the cached set of keys, at block 380, the cache controller 250 adds the key corresponding to the sampled update to the cache 240. After block 370 and/or 380, control moves to block 355.

In the illustrated example of FIG. 3, the monitor 110 determines whether an estimate is to be calculated at block 355. In some examples, a default setting determines whether or not an estimate is to be calculated for each sampled update. In some examples, a user requests an estimate for the status of the example system and/or an estimate for a characteristic of the data communication system 100.

In the illustrated example, the monitor 110 uses the keys i in the cache and their associated counts $c_i$ to make the estimate at block 360 of FIG. 3. The example estimator 270 estimates the status (e.g., the number of open data connections) and/or one or more characteristic(s) (e.g., a number of a particular type (e.g., FTP) of data connection to a particular country, etc.) of the data communication system 100. In the illustrated example, to estimate the example status of the data communication system 100, the example estimator 270 estimates the number of open data connections based on the counts $c_i$ of the keys stored in the cache 240. In the illustrated example, to make an estimate of the characteristic(s), the estimator 270 identifies the keys stored in the cache 240 that have the corresponding characteristic(s) and uses those keys to generate an estimate. In the illustrated example, the estimator generates a sum s of the open data connections or those data connections having the corresponding characteristic based on the keys stored in the cache 240, their corresponding counts kept in counter 230, and the sampling threshold $\tau$, where $s \leftarrow s + \tau + c_i$. The sum s corresponds to an estimate of the status (e.g., number of open data connections) of the data communication system 100 and/or an estimate of the corresponding characteristic(s) (e.g., number of open data connections to a region outside of the country).

FIG. 4 illustrates first example machine readable instructions 400 that may be executed to implement the block 370 of FIG. 3. The example monitor 110 executes the instructions 400 to determine whether a sampled update corresponding to a key that is not stored in the cache 240 should be added to the cache 240. At block 410, the cache controller 250 retrieves the sampling rate from the sampler 210. The cache controller 250 inverts the sampling rate to determine the sampling threshold $\tau$. The cache controller 250 provides the sampling threshold $\tau$ to the random number generator 260.

At block 420, the cache controller 250 instructs the random number generator 260 to generate a random number r based on the sampling threshold $\tau$. In the illustrated example, random numbers r generated by the random number generator 260 at block 420 are exponentially distributed with a mean substantially equal to the sampling threshold $\tau$. The random number generator 260 provides the cache controller 250 with the random number r at block 420, and control moves to block 430.

At block 430 of FIG. 4, the example cache controller 250 determines whether the generated random number r is less than the update weight $\Delta$ associated with a next data sample in the data stream being monitored by the data port 204. In the illustrated example, a random number r that is less than the update weight $\Delta$ ($r < \Delta$) indicates that the update weight is positive. However, if the random number r is greater than or equal to the update weight $\Delta$ ($r \geq \Delta$), the update is considered insignificant and/or a negative update. In the illustrated example, if the random number r is not less than the update weight $\Delta$, then control moves to block 440. At block 440 of FIG. 4, a decision is made to not add a key corresponding to the data sample to the cache 240.

In the illustrated example, at block 430 of FIG. 4, if the random number r is less than the update weight $\Delta$, then control moves to block 450. At block 450, a decision is made to add a key i corresponding to the sampled update to the cache 240. Additionally, the counter 230 adjusts the count $c_i$ for the key i added to the cache 240 based on the update weight $\Delta$ and the random number r, such that $c_i \leftarrow \Delta - r$. Adjusting the count $c_i$ to include the random variable r accounts for any prior updates for the key i that may not have been sampled by the sampler 210.

The example machine readable instructions 300, 400 of FIGS. 3 and/or 4 may be represented by the following procedures:

```
 1: procedure UPDATE (i,Δ)
 2:     if i ∈ S then
 3:         c_i ← c_i + Δ
 4:         if c_i ≤ 0 then
 5:             S ← S \ {i}
 6:     else
 7:         r ← Exp_τ
 8:         if r<Δ then
 9:             S ← S ∪ {i} , c_i ← Δ - r
10: procedure SUBSETSUMEST(P)
11:     s ← 0
12:     for i ∈ S do
13:         if P(i) then
14:             s ← s + τ + c_i
15: return s
```

In the examples described herein, a key i is associated with a count $c_i$. For keys i that are not stored in the cache 240 ($i \notin S$) the count $c_i$ is equal to zero ($c_{i=0}$). In some examples, the distribution of the count $c_i$ of the key i (e.g., corresponding to the first node 130) depends on a true value $v_i$ of the first node 130 (e.g., the actual number of open data connections at the first node 130).

It can be shown by the following that in the examples presented herein, if the random number generator 260 employs an exponential distribution with mean $\tau$ to generate a random number r, the distribution of $c_i$ for a key i with a value $v_i$ is:

$$[v_i - \text{Exp}_\tau]^+ \qquad (1)$$

where $\text{Exp}_\tau$ is a random variable exponentially distributed with mean $\tau$ (e.g., the random number r), where $\tau$ is the sampling threshold. In the above equation, the notation $[x]^+$ indicates a function $\max\{x, 0\}$.

The distribution of the count $c_i$ is determined based on changes in the count $c_i$ in response to updates of the value $v_i$. For example, assuming a fixed key i and the set of n updates being $\{\Delta_{(n)} : n = 0, 1, 2, \ldots\}$ then the corresponding values $v_n$ are $v_{(0)} = 0$ and $v_{(n+1)} = [v_{(n)} + \Delta_{(n)}]^+$. In such examples, the value $v_i$ at a given time is the cumulative result of updates for a corresponding key (e.g., the first node 130) that have occurred up to that time. For example, if all four connections are initially closed for the first node 130, then if two connections open ($\Delta_1$=+2), followed by one of those connections closing ($\Delta_{2-1}$), the value $v_i$ of the first node 130 at that given time is plus one ($v_3$=0+2-1=+1).

In the illustrated example, based on the instructions 300 of FIG. 3, the corresponding counts $c_i$ are $c_{(0)}$=0 with $$c_{(n+1)} = I(c_{(n)}>0)[c_{(n)}+\Delta_{(n)}]^+ + I(c_{(n)}=0)[\Delta_{(n)}-\text{Exp}_{(n)}]^+ \quad (2)$$

where the elements of the set of $\text{Exp}_{(n)}(\{\text{Exp}_{(n)}:n=0, 1, 2, \ldots\})$ are independent and identically distributed random variables of the mean $\tau$, and I is an indicator function (i.e., where $I(X)=1$ if the condition X is true, and $I(X)=0$ if the condition X is false). When the count value is equal to zero, $c=0$, in the illustrated example, the corresponding count c is not maintained for the key in question (i.e., the key i is not in the cache 240). In particular, when the count $c_{i(n)}$=0, the counter 230 does not maintain a count c for this key prior to an update $\Delta_{(n)}$. In the illustrated example, taking a positive part $[c_{(n)}+\Delta_{(n)}]^+$ ensures that when the update $\Delta_{(n)}$ yields a non-positive count value, that count $c_i$ and corresponding key i is removed from the cache 240.

In some examples, for each update n=0, 1, ..., of a particular count $c_i=c$ $$c_{(n)} =^d [v_{(n)}-\text{Exp}]^+ \quad (3)$$

where $=^d$ denotes equality in distribution, and Exp is an exponential random variable of mean $\tau$ independent of $\{\text{Exp}_{(n')}:n'\geq n\}$. Assuming the condition in equation (3) is valid, then the count $c_{(n+1)}$ by equation (2) yields $\tilde{c}_{(n+1)}$ as follows:

$$c_{(n+1)} = \tilde{c}_{(n+1)} := I(v_{(n)}>\text{Exp})[v_{(n)}-\text{Exp}+\Delta_{(n)}]^+ + I(v_{(n)}\leq\text{Exp})[\Delta_{(n)}-\text{Exp}_{(n)}]^+. \quad (4)$$

In the such examples, $$\tilde{c}_{(n+1)} =^d c'_{(n+1)} =^d [[v_{(n)}+\Delta_{(n)}]^+ - \text{Exp}']^+ \quad (5)$$

where Exp' is an independent copy of Exp. When $v_{(n)}+\Delta_{(n)}\leq 0$ then $c'_{(n+1)} = \tilde{c}_{(n+1)} = 0$. When $v_{(n)}+\Delta_{(n)}>0$, the complementary cumulative distribution function (CCDF) of $c'_{(n+1)}$ is (where Pr[X] denotes the probability of X):

$$Pr[c'_{(n+1)} > z] = Pr[\text{Exp} < [v_{(n)}+\Delta_{(n)}-z]^+]) \quad (6)$$
$$= 1 - e^{-[v_{(n)}+\Delta_{(n)}-z]^+/\tau}, \text{ for } z \geq 0.$$

The CCDF of $\tilde{c}_{(n+1)}$ can be derived from equation (5) as $$Pr[\tilde{c}_{(n+1)}>z] = Pr[\text{Exp}<\min\{v_{(n)},[v_{(n)}+\Delta_{(n)}-z]^+\}] + Pr[v_{(n)}\leq\text{Exp}]Pr[\text{Exp}_{(n)}<[\Delta_{(n)}-z]^+] \quad (7)$$

When $\Delta_{(n)}<z$, the first term in equation (6) is $$Pr[\text{Exp}<[v_{(n)}+\Delta_{(n)}-z]^+]=Pr[c'_{(n+1)}>z] \quad (8)$$

and the second term is zero. When $\Delta_{(n)}\geq z$, then $$Pr[\tilde{c}_{(n+1)} > z] = Pr[\text{Exp} < v_{(n)}] + Pr[\text{Exp} \geq v_{(n)}]Pr[\text{Exp}_{(n)} < \Delta_{(n)} - z] \quad (9)$$
$$= (1 - e^{-v_{(n)}/\tau}) + e^{-v_{(n)}/\tau}(1 - e^{-(\Delta_{(n)}-z)/\tau})$$
$$= 1 - e^{-(v_{(n)}+\Delta_{(n)}-z)/\tau}$$
$$= 1 - e^{-[v_{(n)}+\Delta_{(n)}-z]^+/\tau}$$
$$= Pr[c'_{(n+1)} > z]$$

From Equation (1), the distribution of the counter $c_i$ depends on the true value $v_i$, and can be represented by a truncated exponential distribution when the random number generator 360 employs an exponential distribution to generate its random number. Accordingly, the above example processes executed by the sampling instructions 300 of FIG. 3 is similar in distribution to a sampling procedure where each key i is unique, and occurs once with value $v_i$. Therefore, in the foregoing examples, unbiased estimators for subset sums s of the cache 240 can be provided.

In some examples, each key is assigned an adjusted weight $\hat{v}_i$, which is equal to the sampling threshold plus the corresponding count ($\tau+c_i$), if the sample i is stored in the cache 240 ($i \in S$), and zero ($\hat{v}_{i=0}$) if it is not stored in the cache 240. Using the convention $c_{i=0}$ for deleted counts, this can be expressed succinctly as $$\hat{v}_i = I(c_i > 0)(c_i + \tau). \quad (10)$$

In the illustrated example above, the estimator 270 estimates a subset sum $\Sigma_{i:P(i)}v_i$ using the subset sum $\Sigma_{i:P(i)}\hat{v}_i$, the latter being the sum of adjusted weights of samples in the cache 240 which satisfy P, wherein P is the status and/or characteristic which the keys should have to be included in the estimate (e.g., being one of the nodes within the data system 100, a member of a group to be monitored or analyzed, the number of data connections that have been opened for a given period of time, etc.). Accordingly, the adjusted weigh $\hat{v}_i$ is an unbiased estimate of the true value $v_i$, as described below.

In some examples, the update weight $\Delta$ is a unit update, i.e. where each update weight $\Delta$ is either +1 or -1 ($\Delta \in \{-1,+1\}$). In some such examples, the monitor 110 uses a variant of the foregoing examples where the example comparison of the update weight $\Delta$ against an exponential distribution succeeds only when $\Delta = +1$, and does so with probability $q=1/\tau$, where $\tau$ is the sampling threshold. In such examples, the count $c_i$ for the key i is initialized to zero, $c_{i=0}$. Further, the count $c_i$ is an integer and may be initialized with value greater than zero ($c_{i\geq 0}$) or uninitialized (when the key is not cached). Accordingly, if a key i is in the cache 240, then the key remains in the cache 240 if a subsequent sampled update associated with the key i does not decrement the count $c_i$ (i.e., the subsequent sampled update does not have a weight $\Delta=-1$). Accordingly, "paired off" increments are erased by decrements, leaving the value $v_i$ from the "unpaired" increments. In the illustrated example, the key i remains in the cache 240 if it is sampled during an example unpaired increment. Therefore, the example key i has count $c_i$ with probability $q(1-q)^{v_i-c_i}$, rather than being sampled with probability $(1-q)^{v_i}$.

In the preceding examples, the distribution of a final count $c_i$ depends on $v_i$. For example, the probability that the key i is cached at termination is $1-\exp(-v_i/\tau)$. In these examples, with the presence of negative updates in the update stream, a key i may be cached at some point during the execution of the instructions 300 of FIG. 3 and subsequently ejected. The key i is not cached if the independent exponential random variables r all exceed their corresponding update $\Delta_{(n)}$.

In the foregoing examples, the probability that the key i is cached at some point during the execution of the instructions 300 of FIG. 3 is $1-\exp(-\Sigma\Delta^+(i)/\tau)$, where $\Sigma\Delta^+(i)=\Sigma_t\max\{0, \Delta_{(n)}\}$ is the sum of positive updates for the key i.

In some examples, when $\Sigma\Delta^+(i)<<\tau$, the probability that a key gets cached is small (approximately $\Sigma\Delta^+(i)/\tau$). Accordingly, the probability that the key is cached at termination is $\approx v_i/\tau$. Summing over all samples, a worst-case cache utilization (which is observed after all negative updates occur at the end), is the ratio of the sum of positive updates to the sum of values, $\Sigma\Delta^+(i):v_i$.

In some examples, the cache controller 250 bounds the cache 240 to a fixed number of k samples. Example approaches disclosed herein bound the number of cached samples to k by effectively increasing the sampling threshold τ for a key i. In some examples, the cache controller 250 increases the sampling threshold $\tau_0$ to a new sampling threshold $\tau_1$, where $\tau_1 > \tau_0$. Assuming a given key i, the process achieves substantially the same distribution as if the sampling threshold had always been $\tau_1$ (rather than originally $\tau_0$). In the illustrated example, with a probability $q=\tau_0/\tau_1$, no change is made to the count $c_i$; otherwise, the count $c_i$ is reduced based on a random number variable r having an exponential distribution with mean $\tau_1$. If the count $c_i$ is less than zero ($c_i<0$), the key i is removed from the cache 240.

As an example, let $c\geq 0$, $0\leq \tau_0, \tau_1$, u be a random variable uniformly distributed in (0,1), and $\text{Exp}_{\tau_1}$ be an exponential random variable of mean $\tau_1$ independent of u. Accordingly, a random variable θ is defined as:

$$\Theta(c,\tau_0,\tau_1) = I(u\tau_1 > \tau_0)[c - \text{Exp}_{\tau_1}]^+ + I(u\tau_1 \leq \tau_0)c \quad (11)$$

where $\Theta(c,\tau_0,\tau_1)=c$ when $\tau_1 \leq \tau_0$. In this example, the following procedure replaces the count $c_i$ with the value $\Theta(c_i,\tau_0,\tau_1)$ if this value is positive. If the value $\Theta(c_i,\tau_0,\tau_1)$ is not positive, the cache controller 250 removes the key i from the cache 240.

The sampling threshold τ may be increased according to the example methods disclosed herein using the following procedure:

```
Require: τ₁ > τ₀, i ∈ S
1: procedure SAMPTHRESHINC (i, cᵢ, τ₀, τ₁)
2:     u ← rand ( )
3:     if τ₁ > τ₀/u then
4:         z ← rand ( )
5:         r ← (−ln(z))τ₁
6:         cᵢ ← cᵢ − r
7:         if cᵢ ≤ 0 then S ← S \ {i}
```

In the above foregoing example, replacing the count $c_i$ with the defined random variable θ preserves unbiasedness. In particular, the distribution of the updated count $c_i$ under θ is substantially equivalent to a fixed-rate Sample and Hold procedure with a sampling threshold $\tau_1$.

In the illustrated example, letting $0\leq \tau_0 < \tau_1$ and $\tilde{c}=\Theta(c,\tau_0,\tau_1)$, yields:

$$E[I(\tilde{c}>0)(\tilde{c}+\tau_1)|c] = c+\tau_0 \quad (1)$$

if $c =^d [v-\text{Exp}_{\tau_0}]^+$, then $\tilde{c} =^d [v-\text{Exp}_{\tau_1}]^+$ (2)

where E[X] denotes an expectation function. The above estimate (1) is found by calculating the following:

$$E[I(\tilde{c}>0)(\tilde{c}+\tau_1)|c] = (1-\tau_0/\tau_1)\int_{0^e}^{c-x/\tau_1}(c-x+\tau_1)dx + \quad (12)$$
$$(\tau_0/\tau_1)(c+\tau_1)$$
$$= (1-\tau_0/\tau_1)c + (\tau_0/\tau_1)(c+\tau_1)$$
$$= c+\tau_0$$

To determine the above distribution (2), let $c =^d [v-\text{Exp}_{\tau_0}]^+$ and the variable $\Theta(c,\tau_0,\tau_1)$ can be written as $[v-W]^+$ where $$W = I(\tau_1 u > \tau_0)(\text{Exp}_{\tau_0}+\text{Exp}_{\tau_1}) + I(\tau_1 u \leq \tau_0)\text{Exp}_{\tau_1}. \quad (13)$$

Accordingly, a direct computation of convolution of distributions shows that $\text{Exp}_{\tau_0}+\text{Exp}_{\tau_1}$ has distribution function $x \to (\tau_1 \text{Exp}_{\tau_1}(x) - \tau_0 \text{Exp}_{\tau_0}(x))/(\tau_1-\tau_0)$. To this end, using $\Pr[\tau_1 u > \tau_0]=1-\tau_0/\tau_1$, then a distribution for W can be found as follows:

$$W(x) = \Pr[\tau_1 u > \tau_0](\text{Exp}_{\tau_0} + \text{Exp}_{\tau_1})(x) + \quad (14)$$
$$\Pr[\tau_1 u \leq \tau_0]\text{Exp}_{\tau_1}(x)$$
$$= \text{Exp}_{\tau_1}(x)$$

FIG. 5 illustrates second example machine readable instructions 500 that may be executed to implement the block 370 of FIG. 3. The example monitor 110 executes the instructions 500 to determine whether a key (e.g., for a sampled update being evaluated) that is not stored in the cache 240 should be added to the cache 240. If the example monitor 110 determines that the key is to be added to the cache 240, the example monitor 110 also removes a key from the cache to maintain a bounded number of k samples.

In the illustrated example of FIG. 5, for each cached key i in the cache 240, a respective count $c_i$ is stored in the counter 230 and a respective sampling threshold $\tau_i$ is maintained by the cache controller 250. In the illustrated example, the sampling threshold $\tau_i$ is set to a sampling threshold in force during a most recent update A of the corresponding key i. In some examples, the sampling threshold $\tau_i$ is adjusted upward due to a removal of another key from the cache 240, as described below.

At block 510 of FIG. 5, the example cache controller 250 determines whether the update weight Δ for the key i is positive (Δ>0). If the update weight Δ is not positive, control moves to block 520. At block 520 of FIG. 5 a decision is made not to add a key i corresponding to the sampled update to the cache 240.

In the example of FIG. 5, if the update weight Δ is positive, control moves to block 530. At block 530, the example cache controller 250 sets the sampling threshold $\tau_i$ to zero ($\tau_i \leftarrow 0$) and the example counter 230 sets the count $c_i$ equal to the update weight Δ ($c_i \leftarrow \Delta$). Accordingly, in the illustrated example, the key i will be added to the cache 240 with a corresponding sampling threshold of zero maintained by the cache controller 250 and a count equal to the update change stored in the counter 230.

At block 540 of FIG. 5, the cache controller 250 determines the number of keys stored in the cache 240, and whether that number exceeds the maximum number of k keys. If cache controller 250 determines the number of samples is equal to or less than the maximum number of k keys (|S|≤k), control moves to block 550. At block 550 of FIG. 5, a decision is made to add a key i corresponding to the sampled update to the cache 240 and that no other keys need to be removed from the cache 240.

In the example of FIG. 5, if the cache controller 250 determines the number of keys stored in the cache 240 is greater than the maximum number of k keys (|S|>k), control moves to block 560. At block 560 of FIG. 5, key is removed from the cache 240, as described below. Also, at block 560, a decision is made to add a key i corresponding to the sampled update to the cache 240 and another key that is different from key i is removed from the cache 240 based on a newly calculated sampling threshold $T_i$.

The example machine readable instructions 300, 500 of FIGS. 3 and/or 5 may be represented by the following procedures:

```
 1: procedure UPDATE (i, Δ)
 2:   if i ∈ S then
 3:     c_i ← c_i + Δ
 4:     if c_i ≤ 0 then
 5:       S ← S \ {i}
 6:   else if Δ > 0 then
 7:     S ← S ∪ {i}, τ_i ← 0, c_i ← Δ
 8:     if |S|=k+1 then
 9:       EJECTONE(S)
10: procedure SUBSETSUMEST(P)
11:   s ← 0
12:   for i ∈ S do
13:     if P(i) then
14:       s ← s + τ_i + c_i
15:   return s
16: procedure EJECTONE(S)
17:   for i ∈ S do
18:     u_i ← rand( ), z_i ← rand( )
19:     T_i ← max { τ_i/u_i , c_i/(−log(z_i)) }
20:   τ* ← min_{i∈S} T_i
21:   for i ∈ S do
22:     if T_i = τ* then S ← S \ {i}
23:     else
24:       if τ_i ≤ τ* then
25:         if τ* u_i > τ_i then
26:           c_i ← c_i + τ* log z_i
27:         τ_i ← τ*
```

In the preceding example, when the cache 240 is not full, a new key i is admitted with a sampling threshold $\tau_i$ equal to zero ($\tau_{i=0}$). In such examples, when the cache 240 is full, such that the cache 240 contains k keys, a new key is provisionally admitted (such that the cache 240 now has k+1 keys), and at block 560 one of the k+1 keys in the cache 240 is selected to be removed. In the example above, the procedure EJECTONE(S) adjusts a minimum sampling threshold $\tau^*$ to a lowest value for which one key will be removed from the cache 240. The example procedure to adjust the minimum threshold $\tau^*$ is based on the effects of increasing the sampling threshold (e.g., using random variable θ, described herein) on the count $c_i$, fixing an independent randomization of variates $u_i$, $z_i$ for each i, and finding the smallest threshold $\tau^*$ for which $\tilde{c}_i = \Theta(c_i, \tau_i, \tau^*) = 0$ for some i. In this example, this key is removed, while thresholds of keys remaining in the cache 240 are adjusted as $(c_i, \tau_i) \leftarrow (\tilde{c}_i, \tau^*)$ if the sampling threshold $\tau_i$ is less than or equal to the minimum sampling threshold $\tau^*$ ($\tau_i \leq \tau^*$). In some examples, if the sampling threshold $\tau_i$ for key i is greater than the minimum sampling threshold $\tau^*$ ($\tau_i > \tau^*$), then the count $c_i$ and sampling threshold $\tau_i$ are not changed.

In the foregoing example, it can be shown by the following that the estimated weight $\hat{v}_i$ remains unbiased under the action of the removal procedure described above (EJECTONE(S)). This can be demonstrated by assuming a key i, fixing a count $c_j$, and fixing for j≠i the random variates $u_j$, $z_j$ to fix the effect of random past selections and updates. Further, fixing $T_j = \max\{\tau_j/u_j, c_j/(−\log z_j)\}$ and $\tau' = \min_{j\neq i} T_j$, and updating the count $c_i$ to $\tilde{c}_i = \Theta(c_i, \tau_i, \tau')$ establishes that $\tilde{v}_i = I(\tilde{c}_i > 0)(\tilde{c}_i + \tau')$ is a (conditionally) unbiased estimator of $v_i$ for any fixed $\tau'$ as described below.

In the foregoing example, the count $\tilde{c}_i$ corresponds to the action on the count $c_i$ described with respect to increasing the sampling threshold $\tau_i$, as described herein, and can be found to be:

$$\tilde{c}_i = I(\tau' u_i > \tau_i)[c_i - \text{Exp}_{\tau'}]^+ + I(\tau' u_i \leq \tau_i) c_i \quad (15)$$

where $\text{Exp}_{\tau'}$ is equivalent to $-\tau' \log z_i$. When $T_i < \tau'$, corresponding to a case where $\{\tau' > \tau_i/u_i\} \cap \{\tau' > c_i/(-\log z_i)\}$, the key i is selected by the cache controller 250 to be removed from the cache 240. This corresponds to the case where $\{\tau' > \tau_i/u_i\} \cap \{\tau' > c_i/(-\log z_i)\}$. When $\tau' > \tau_i/u_i$, the first term in the above expression for $\tilde{c}_i$ is selected, whereas when $\tau' > c_i/(-\log z_i)$, the count $\vec{c}_i$ is set to zero ($\tilde{c}_{i=0}$) and the corresponding key i is removed from the cache 240. If $T_i \geq \tau'$, the first or second term in the expression for $\tilde{c}_i$ may be selected, but both cannot be equal to zero.

Let the value $\tilde{v}_i$ denote the estimate of $v_i$ based on $\vec{c}_i = \Theta(c_i, \tau_i, \tau')$. Then, from the discussion above $$E[\tilde{v}_i | \tau', c_i > 0] = E[I(\tilde{c}_i > 0)(\tilde{c}_i + \tau') | \tau', c_i > 0] = c_i + \tau_i \quad (16)$$

independent of $\tau'$, and, therefore, $E[\tilde{v}_i] = E[I(c_i > 0)(c_i + \tau_i)] = v_i$.

In some examples, when $c_i = ^d[v_i - \text{Exp}_\tau]^+$, the unbiased estimate $\hat{v}_i = I(c_i > 0)(c_i + \tau_i)$ has variance:

$$\text{Var}[\hat{v}_i] = \tau_i^2(1 - e^{-v_i/\tau_i}). \quad (17)$$

Moreover, $\text{Var}[\hat{v}_i]$ itself has an unbiased estimator $s_i^2$ that does not depend explicitly on the value $v_i$:

$$s_i^2 = I(c_i > 0)\tau_i^2. \quad (18)$$

In the illustrated example, for a key in the cache 240, uncertainty concerning $v_i$ is determined by the estimated unsampled updates, which are exponentially distributed with mean $\tau_i$ and variance $\tau_i^2$. Accordingly, both $\text{Var}[\hat{v}_i]$ and $s_i^2$ are increasing functions of $\tau_i$.

In some examples, the estimated variance with a given key is non-decreasing while the key i is stored in the cache 240, then drops to zero when the key i is removed from the cache 240, but may increase after further updates for that key i are sampled by the sampler 210. In such examples, because $s_i^2$ is increasing in $\tau_i$, an upper bound on the variance is obtained using the maximum threshold $\tau^*$ encountered over all instances of the keys stored in the cache 240 analyzed during the removal procedure (EJECTONE). The example maximum threshold $\tau^*$ may be reached because a key i processed by the removal procedure gives rise to the largest sampling threshold $\tau$ associated with each particular key in the cache 240.

In some examples, an overwrite streams model may be implemented, where an update of the form (i,v) means that the weight associated with key i is updated to v. In this example, the update (i,0) corresponds to a deletion of the key. This example captures the notion of "updating" information about a sample.

In the overwrite streams example, for sampling at a constant rate $q = 1/\tau$, if the sampler 210 samples an update for a key i which is already stored in the cache 240, the key i is removed from the cache 240. In some such examples, an independent determination can be made by the cache controller 250 whether to retain the current key i based on its weight v and the sampling threshold $\tau$. In such examples, correctness (i.e. that the sampling is distributed as a Poisson sample on the final values for each key) is immediate. In some examples, a removal procedure similar to EJECTONE may be implemented based on a corresponding sampling threshold $\tau_i$ to account for depletion of the cache 240 due to overwrites and/or exceeding the cache limit (k) due to never before sampled updates.

Figure 6:
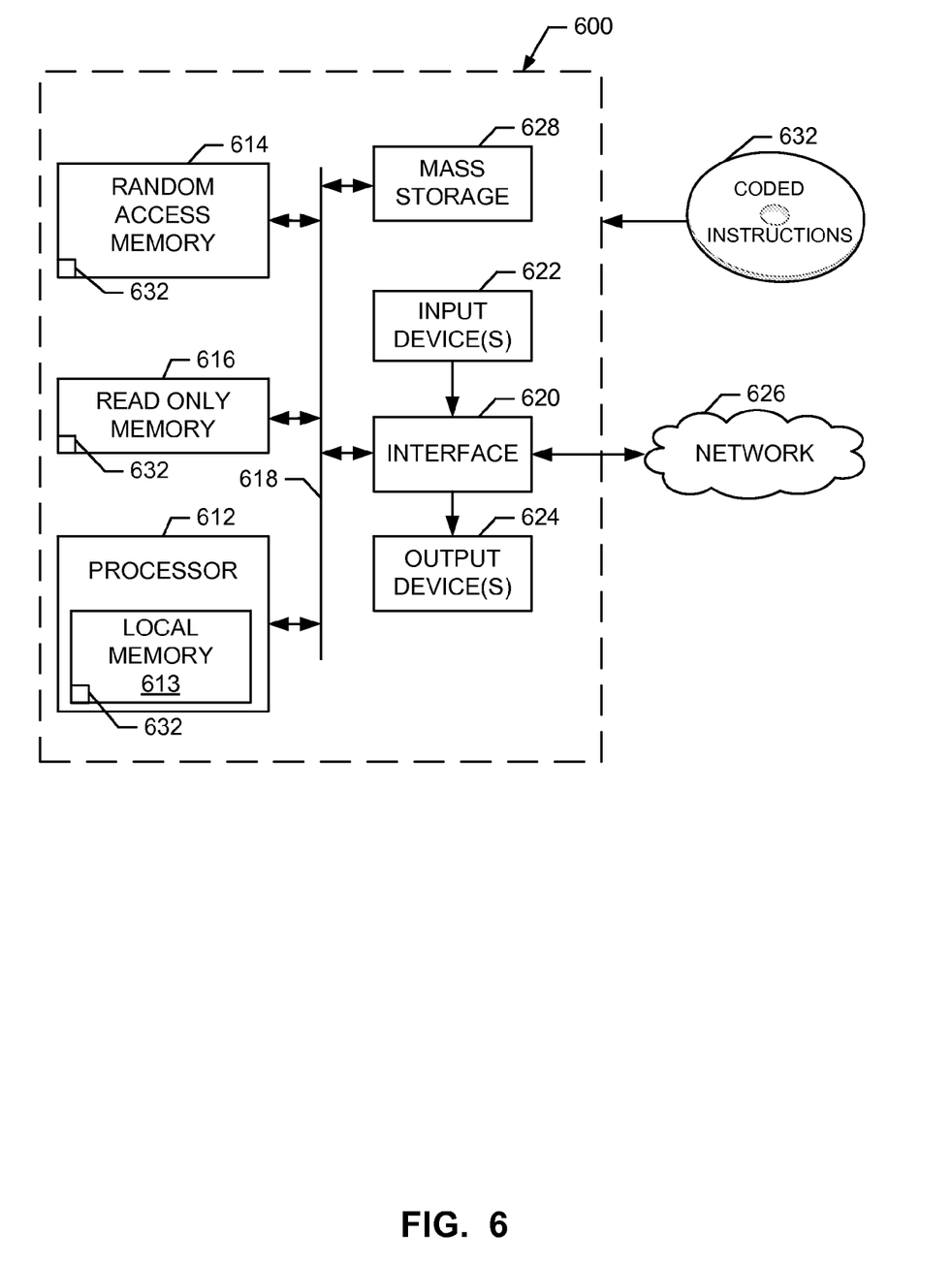
FIG. 6 is a block diagram of an example processor platform to execute the instructions of FIGS. 3, 4, and/or 5 to implement the example monitor of FIGS. 1 and/or 2.

FIG. 6 is a block diagram of an example processor platform 600 capable of executing the instructions of FIGS. 3, 4 and/or 5 to implement the monitor 110 of FIGS. 1 and/or 2. The processor platform 600 can be, for example, the monitor 110, a server, a personal computer, a mobile phone (e.g., a cell phone), a personal digital assistant (PDA), an Internet appliance, a set top box, or any other type of computing device.

The processor platform 600 of the instant example includes a processor 612. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) 622 can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), and/or speakers). The interface circuit 620, thus, typically includes a graphics driver card.

The interface circuit 620 also includes a communication device (e.g., the data port 204 of FIG. 2) such as a modem or network interface card to facilitate exchange of data with external computers via a network 626 (e.g., an Ethernet connection, a digital subscriber line (DSL), a telephone line, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives. The mass storage device 628 may implement the cache 240.

The coded instructions 632, which may implement the coded instructions 300, 400, 500 of FIGS. 3, 4, and/or 5, may be stored in the mass storage device 628, in the volatile memory 614, in the non-volatile memory 616, and/or on a removable storage disk such as a CD or DVD.

From the foregoing, it will appreciate that the example methods, apparatus and articles of manufacture have been disclosed to enable sampling of weighted updates, whether positive or negative.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method comprising:
identifying, via a processor, a first key associated with a data update obtained by sampling a stream of data received from a plurality of nodes in a network, the first key being representative of a first node in the plurality of nodes;
adjusting, via the processor, a first value associated with the first key based on a weight associated with the data update to determine a first adjusted value, the weight being positive when the data update corresponds to opening of a new data connection with the first node, the weight being negative when the data update corresponds to closing of an existing data connection with the first node; and
estimating, via the processor, a status associated with the plurality of nodes based on the first adjusted value.

2. The method according to claim 1, further comprising:
determining a characteristic of the first key,
storing the characteristic of the first key in the cache, and
estimating a status of the network based on the characteristic of the first key.

3. The method according to claim 1, further comprising caching a plurality of keys representing a subset of the plurality of nodes in a cache.

4. The method according to claim 3, wherein the plurality of keys have respective values representing respective numbers of active data connections of the subset of the plurality of nodes.

5. The method according to claim 3, further comprising removing the first key from the cache if the first adjusted value is not greater than zero.

6. The method according to claim 3, further comprising adjusting a first sampling threshold corresponding to the key based on a number of keys to be maintained in the cache by eliminating a second key from the cache based on a second sampling threshold corresponding to the second key.

7. The method according to claim 1, further comprising estimating the status of the network based on the status of the plurality of nodes.

8. An apparatus comprising:
a hardware memory to store machine readable instructions; and
a processor to execute the instructions to perform operations comprising:
identifying a first key associated with a data update obtained by sampling a stream of data received from a plurality of nodes in a network, the first key being representative of a first node in the plurality of nodes;
adjusting a first value associated with the first key based on a weight associated with the data update to determine a first adjusted value, the weight being positive when the data update corresponds to opening of a new data connection with the first node, the weight being negative when the data update corresponds to closing of an existing data connection with the first node; and
estimating a status of the plurality of nodes based on the first adjusted value.

9. The apparatus according to claim 8, wherein the operations further comprise: determining a characteristic of the first key, storing the characteristic of the first key in the cache, and estimating a status of the network based on the characteristic of the first key.

10. The apparatus according to claim 8, wherein the operations further comprise caching a plurality of keys representing a subset of the plurality of nodes in a cache.

11. The apparatus according to claim 10, wherein the plurality of keys have respective values representing respective numbers of active data connections of the subset of the plurality of nodes.

12. The apparatus according to claim 10, wherein the operations further comprise removing the first key from the cache if the first adjusted value is not greater than zero.

13. The apparatus according to claim 8, wherein the operations further comprise adjusting a first sampling threshold corresponding to the key based on a number of keys to be maintained in the cache by eliminating a second key from the cache based on a second sampling threshold corresponding to the second key.

14. The apparatus according to claim 8, wherein the operations further comprise estimating the status of the network based on the status of the first node.

15. A hardware memory comprising instructions which, when executed, cause a machine to perform operations comprising:
identifying a first key associated with a data update obtained by sampling a stream of data received from a plurality of nodes in a network, the first key being representative of a first node in the plurality of nodes;
adjusting a first value associated with the first key based on a weight associated with the data update to determine a first adjusted value, the weight being positive when the data update corresponds to opening of a new data connection with the first node, the weight being negative when the data update corresponds to closing of an existing data connection with the first node; and
estimating a status of the plurality of nodes based on the first adjusted value.

16. The hardware memory defined in claim 15, wherein the operations further comprise: determining a characteristic of the first key, storing the characteristic of the first key in the cache, and estimating a status of the network based on the characteristic of the first key.

17. The hardware memory according to defined in claim 15, wherein the operations further comprise caching a plurality of keys representing a subset of the plurality of nodes in a cache.

18. The hardware memory defined in claim 17, wherein the plurality of keys have respective values representing respective numbers of active data connections of the subset of the plurality of nodes.

19. The hardware memory defined in claim 17, wherein the operations further comprise removing the first key from the cache if the first adjusted value is not greater than zero.

20. The hardware memory defined in claim 15, wherein the operations further comprise adjusting a first sampling threshold corresponding to the key based on a number of keys to be maintained in the cache by eliminating a second key from the cache based on a second sampling threshold corresponding to the second key.

* * * * *